United States Patent [19]

Suzuki

[11] Patent Number: 5,727,769
[45] Date of Patent: Mar. 17, 1998

[54] SOLENOID VALVE FOR FLOW RATE CONTROL

[75] Inventor: Isao Suzuki, Tokyo, Japan

[73] Assignee: MKS Japan, Inc., Tokyo, Japan

[21] Appl. No.: 650,139

[22] Filed: May 17, 1996

[30] Foreign Application Priority Data

May 22, 1995 [JP] Japan .................. 7-122292

[51] Int. Cl.⁶ ........................... F16K 31/08
[52] U.S. Cl. ........................ 251/129.15; 251/65
[58] Field of Search ............... 251/129.15, 65, 251/129.01

[56] References Cited

U.S. PATENT DOCUMENTS 4,738,430  4/1988  Pichon .................. 251/129.15
5,029,807  7/1991  Fuchs .................... 251/65
5,035,306  7/1991  Ashiba .................. 251/65 X

*Primary Examiner*—Kevin Lee
*Attorney, Agent, or Firm*—Wenderoth, Lind & Ponack

[57] ABSTRACT

A solenoid valve is disclosed and includes a solenoid, a plunger made of a magnetic material, and a yoke receiving the plunger therein such that the plunger may be moved by the magnetic field produced by the solenoid. A valve element is connected to the plunger for controlling the rate of flow through the solenoid valve. A permanent magnet is disposed in a desired position outside the yoke. The magnetic flux of the magnetic field of the permanent magnet is effectively used for damping the oscillation of the plunger to thereby achieve excellent controllability of the valve.

8 Claims, 4 Drawing Sheets

SOLENOID VALVE FOR FLOW RATE CONTROL

BACKGROUND OF THE INVENTION

1. Field of the Invention

The present invention relates to a solenoid valve which is usable for controlling the flow rate of gasses and other purposes.

2. Description of the Related Art

A typical solenoid valve for controlling a flow rate of such type is disclosed in Japanese Patent Publication No. Hei-3-554 (No. 554/1991), in which a magnetic force is applied to a slidable plunger made of a magnetic material by means of an energized solenoid, so that the plunger is moved against a force of a disc spring connected to the plunger, in a direction to reduce a magnetic gap defined between the plunger and a portion of a yoke. This solenoid valve is advantageous for its simplicity in construction as well as for its ability to impart a strong activating force.

U.S. Pat. No. 4,690,371 discloses another typical solenoid valve for flow rate control, in which a permanent magnet is mounted in a plunger, and the plunger containing the permanent magnet is moved by means of a magnetic field produced by an energized solenoid.

Although the solenoid valve of the Japanese Patent Publication No. 554/1991 imparts a strong force as mentioned, the control of the valve, and in particular, the fine control of the valve in a range where the magnetic gap length is relatively small, is difficult due to the fact that the magnetic force applied to the plunger is in reciprocal proportion to the square of the magnetic gap length. Further, this prior art solenoid valve employs a relatively small and thin disc spring for supporting the relatively massive plunger, so that it is sensitive to any external vibrations and apt to produce periodic oscillation (or hunting) when used in a closed-loop control system including a comparator.

FIG. 7 is a schematic cross-sectional view showing a construction of such a prior art solenoid valve. As shown, the solenoid valve includes a solenoid 702 housed in a solenoid casing 701. A plunger 703 is made of a magnetic material and slidably received in a yoke 704, and a disc spring 705 is provided and interconnects the plunger 703 and the yoke 704. When energized, the solenoid 702 pulls to move the plunger 703 in a direction away from the disc spring 705. Assume that the energized solenoid has moved the plunger 703 to the left (as viewed in FIG. 7) and then the solenoid is de-energized (i.e., the voltage applied thereto is turned off to zero) to release the plunger 703 at a time t=t1. Then, the movement of the plunger 703 after t=t1 can be expressed by the solution for x in the following equation (1) of motion (note that the friction acting between the plunger 703 and the yoke 704 and the counter electromotive force induced in the solenoid 702 are neglected in this equation for simplicity):

$$m\,(d^2x/dt^2) = -K\,x \quad (1)$$

where:

m stands for the mass of the plunger 703;
K stands for the spring constant of the disc spring 705; and
x stands for the displacement of the plunger 703
(x=0 when the plunger 703 is at a rest position (i.e., when it is not pulled by the magnetic force of the solenoid 702), and displacements to the left are taken as positive). Solving equation (1) for x, we obtain $$x = A\,\sin((K/m)^{1/2}\,t + a) \quad (2)$$

where: A and a are constants.

As seen from equation (2) above, the plunger 703 will oscillate with an angular velocity of $(K/m)^{1/2}$, or with a frequency of $K^{1/2}/(2\pi\,m^{1/2})$. Actually, this oscillation eventually vanishes because the oscillation energy is gradually lost due to various factors including the friction acting between the plunger 703 and the yoke 702. Nevertheless, it is apparent that the solenoid valve having the arrangement shown above is apt to produce oscillation of the plunger.

On the other hand, the solenoid valve disclosed in U.S. Pat. No. 4,690,371 mentioned above suffers from a shortcoming due to the arrangement wherein the permanent magnet is placed in a stream of fluid, so that it is difficult to use the solenoid valve for a highly corrosive fluid even when the permanent magnet is encased. Moreover, the solenoid valve of this U.S. patent suffers from further problems including high manufacturing costs and even with a long stroke, only limited torque is obtainable.

SUMMARY OF THE INVENTION

The present invention has been developed in order to overcome the above problems experienced with conventional solenoid valves. Accordingly, it is an object of the present invention to provide a solenoid valve which is simple in construction, is effective for suppression of the oscillation of the plunger and provides excellent controllability.

The present application is directed to a solenoid valve including a solenoid for producing a magnetic field, a plunger made of a magnetic material, and a yoke for directing magnetic flux of the magnetic field of the solenoid to the plunger and for receiving the plunger therein such that the plunger may be moved by the magnetic field produced by the solenoid. Also, a valve element is connected to the plunger for controlling the flow in the solenoid valve, and a permanent magnet is disposed outside the yoke for providing a magnetic field such that at least a part of magnetic flux of the magnetic field of the permanent magnet is routed through the plunger.

The present application also includes a groove formed in the plunger at a position corresponding to the position of the permanent magnet.

The yoke has a generally cylindrical shape, and the permanent magnet has a generally ringed shape and is fit over the generally cylindrical yoke.

Also, the permanent magnet has a magnetization axis which is parallel to a geometrical axis of its ringed shape, and a space is defined around the ringed permanent magnet.

In a solenoid valve having the above-noted features, the magnetic flux originating from the permanent magnet is routed through the plunger, so that a magnetic field is produced by the eddy currents induced in the moving plunger depending on its velocity, which provides a drag on the motion of the plunger. That is, this arrangement provides a damper mechanism which stops the oscillation of the plunger so as to quickly settle the plunger into a desired position.

Further, the magnetic flux originating from the permanent magnet and routed through the plunger tends to hold the plunger such that the groove falls into a position where the magnetic circuit established by the permanent magnet and the plunger exhibit minimum resistance. This serves to prevent the plunger from descending even if an element such as a disc spring supporting the plunger breaks.

Further, the combination of the cylindrical yoke and the ringed permanent magnet, which fits over the cylindrical yoke, makes it easy to assemble the structure for the damper mechanism utilizing the magnetic field.

Further, the magnetic lines of flux leaving one magnetic pole of the permanent magnet are routed through the plunger to the other magnetic pole of the permanent magnet along a shortest path, so that leakage flux from the plunger may be suppressed to a minimum, resulting in an effective damper mechanism utilizing the magnetic field.

BRIEF DESCRIPTION OF THE DRAWINGS

The above and other objects, features and advantages of the present invention will be apparent from the following detailed description of preferred embodiments thereof, with reference being made to the accompanying drawings, in which.

DETAILED DESCRIPTION OF PREFERRED EMBODIMENTS

Figure 1:
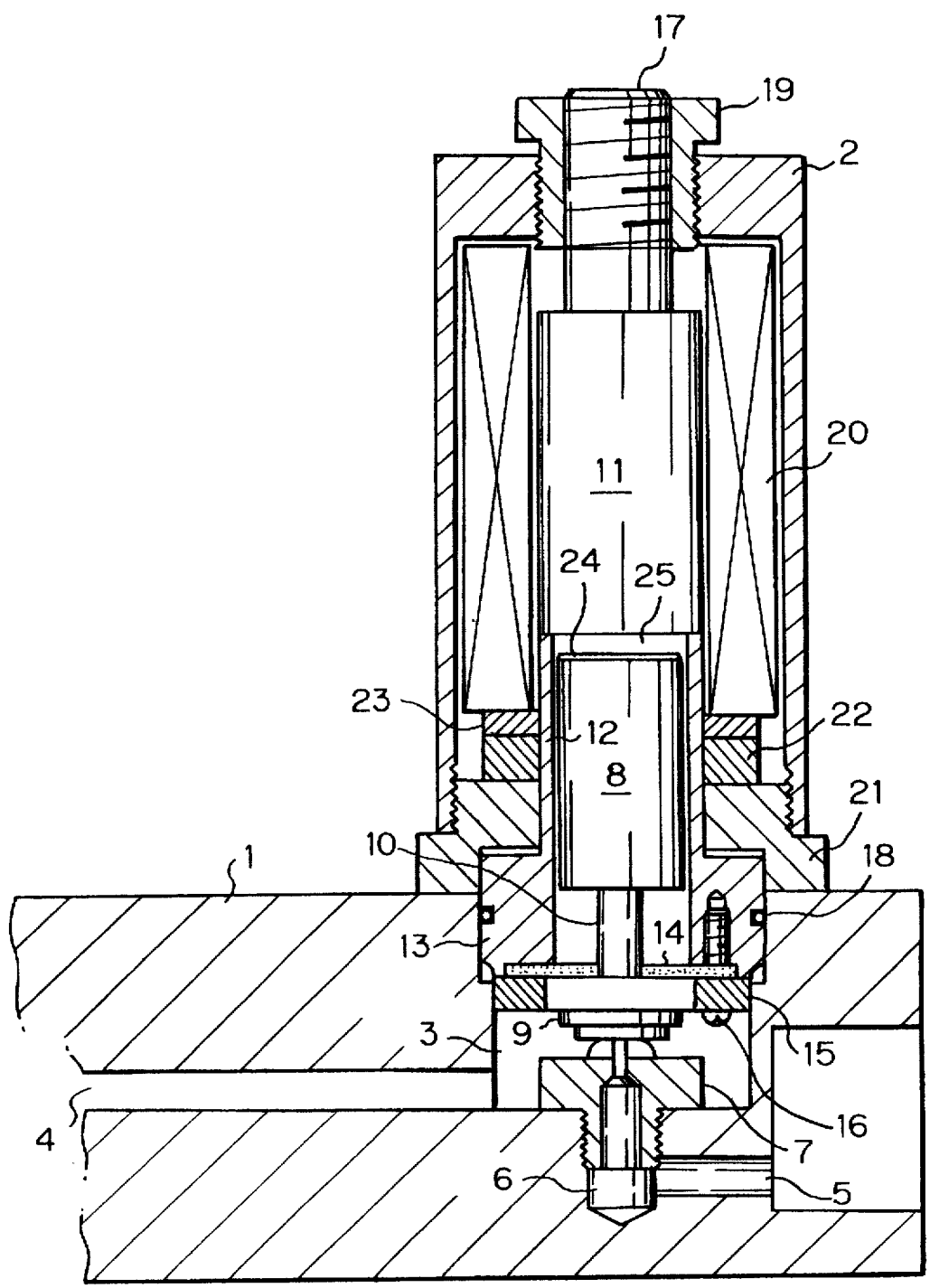
FIG. 1 is a cross-sectional view showing a construction of a solenoid valve according to an embodiment of the present invention.

Referring now to the accompanying drawings, solenoid valves according to preferred embodiments of the present invention will be described in detail. In the drawings, like parts and components are designated by like reference numerals and any repetitive description will be avoided for the sake of simplicity. FIG. 1 shows a cross-sectional view of a solenoid valve according to an embodiment of the present invention. The solenoid valve includes a valve body or base 1 having a generally elongate box-like shape extending horizontally and a solenoid casing 2 mounted upright on the base 1. The base 1 has a generally cylindrical valve chamber 3 formed therein, as well as inlet and outlet passageways 4 which are formed therein and in communication with the valve chamber 3. The outlet passageway 5 has an enlarged end portion which opens at one end surface of the base 1.

A vertical passageway 6 is formed in the bottom of the valve chamber 3 so as to communicate with the valve chamber 3 and the outlet passageway 5. The vertical passageway 6 has an internal threaded portion at the upper end thereof to which a valve seat 7 is threadly mounted. A valve element, having a valve head 9 and a stem 10, is disposed in the valve chamber 3 and cooperates with the valve seat 7 so as to control the flow of fluid passing through the solenoid valve. The valve element is fixedly connected to a plunger 8 at stem 10 as well as being connected with a disc spring 14 at valve head 9. The plunger 8 is made of a magnetic material. There is provided a yoke having a generally cylindrical shape and including an upper solid cylindrical portion 11 and a lower hollow cylindrical portion 12 which has an outer flange 13. The upper and lower portions 11 and 12 of the yoke may be separately fabricated and then welded to each other. A circumferential groove 18 is formed in the outer flange 13 for receiving a sealing ring 18. The flange 13 also has a plurality of vertical, threaded holes formed therein at suitable positions in the bottom surface of the flange 13. The disc spring 14 is connected to the bottom surface of the flange 13 by means of a retainer ring 15. The returner ring 15 engages an outer peripheral portion of the disc spring 14 and is secured to the bottom surface with screws 16.

The upper portion 11 of the yoke has an upright threaded rod 17 which extends upwardly from the top end thereof. An adjustor ring 19, having threaded inner and outer surfaces, is in threaded engagement with the threaded rod 17. The adjustor ring 19 is also in threaded engagement with a threaded hole formed centrally through a top wall of the solenoid casing 2. By rotating the adjustor ring 19, the vertical position of the yoke and hence the span or movement range of the valve head 9 may be adjusted, so that a set force required to open the valve can be adjusted. A solenoid 20 is mounted in the solenoid casing 2. The yoke serves to direct the magnetic flux of the magnetic field of the solenoid 20 to the plunger 8 as well as to receive the plunger 8 therein such that the plunger 8 may be moved by a magnetic field produced by the solenoid 20.

The bottom end of solenoid casing 2 has an internally threaded portion. A base ring 21 includes an upper small diameter portion and a lower large diameter portion which is fixedly mounted on the base 1 at a position above the valve chamber 3 by means of screws (not shown). The upper small diameter portion of the base ring 21 has a threaded outer surface to which the solenoid casing 2 is threadedly secured. There is also provided a permanent magnet 22 which has a stepped cylindrical or a general ring shape. The permanent magnet 22 is disposed on a top surface of the base ring 21, and fits over the lower portion 12 of the yoke and is thereby located in a desired position. The ring-shaped permanent magnet 22 is magnetized as to have its magnetization axis (i.e., the orientation of the magnetization) parallel to the geometrical axis of its ring shape and to the central axes of the plunger 8 and the yoke (see FIGS. 1 and 3). There is further provided a ring 23 made of a magnetic material, which is disposed on a top end surface of the ring-shaped permanent magnet 22 for directing the magnetic flux originating from the permanent magnet 22 into the plunger 8. In this manner, a magnetic circuit is established within the solenoid casing 2 by the base ring 21, the permanent magnet 22, the ring 23 and the plunger 8. This magnetic circuit serves to route the flux originating from the permanent magnet 22 through the plunger 8. A centering spring 24 is disposed on the top end surface of the plunger 8, and there is a magnetic gap 25 above the centering spring 24. There is also a space around the ring-shaped permanent magnet 22, and more particularly, between the outer surface of the ring-shaped permanent magnet 22 and the inner surface of the solenoid casing 2, so that the magnetic flux originating from the permanent magnet 22 is prevented from being routed through the solenoid casing 2.

Figure 2:
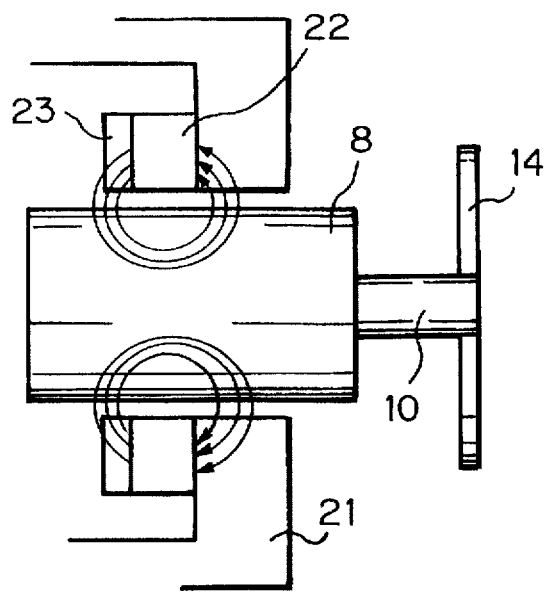
FIG. 2 is a schematic representation showing magnetic flux routed through a plunger of the solenoid valve shown in FIG. 1 when a solenoid of the solenoid valve is de-energized.

The permanent magnet 22 is mounted such that its upper and lower end surfaces define north and south poles, respectively. Accordingly, the magnetic field established in and around the plunger 8 can be represented by the magnetic lines of flux shown in FIG. 2, which leave the permanent magnet 22 at its north pole, are routed through the ring 23, enter the plunger 8 at its side surface, are routed through the plunger 8 generally in an axial direction of the plunger 8, leave the plunger 8 again at its side surface and return to the permanent magnet 22 at its south pole. Here, the ring 23 serves to ensure that the magnetic flux originating from the permanent magnet 22 will be substantially prevented from leaking out to be routed through the magnetic gap 25. If considerable leakage flux occurred and were routed through the magnetic gap 25, the plunger 8 would be pulled toward the upper cylindrical portion 11 of the yoke even when the solenoid 20 is de-energized, resulting in a failure to establish a desired initial condition of the solenoid valve.

Figure 3:
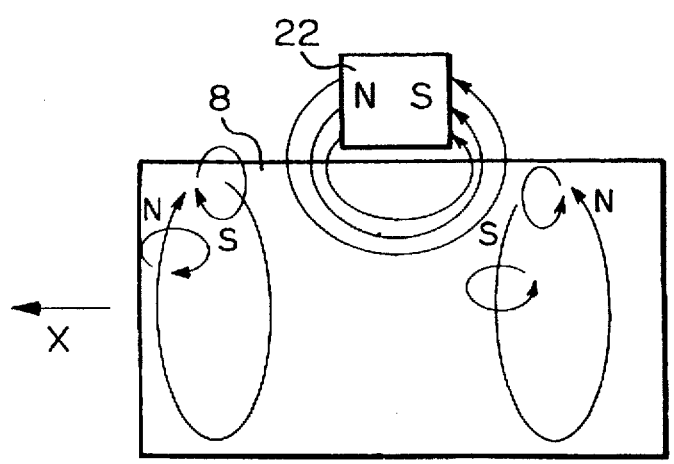
FIG. 3 is a schematic representation showing eddy currents induced in the plunger motion in the solenoid valve of FIG. 1.

In this solenoid valve, having the arrangement described above, any movement of the plunger 8 in the direction indicated by an arrow X in FIG. 3 will induce eddy currents within the plunger 8, as shown in FIG. 3, and the magnitude of the currents depends on the velocity of the plunger 8. The eddy currents produce a magnetic field which acts on the plunger 8 so as to resist the movement of the plunger 8. Therefore, the plunger 8 is subject to a drag force whose magnitude depends on the plunger's velocity. In contrast to equation (1) for the conventional solenoid valve, the equation of motion of the plunger 8 in this solenoid valve is expressed as follows:

$$m\,(d^2x/dt^2) = -K_1\,x - K_2\,(dx/dt) \qquad (3)$$

where:
m stands for the mass of the plunger 8;
$K_1$ stands for the spring constant of the disc spring 14;
$K_2$ stands for a constant for the drag; and
x stands for the displacement of the plunger 8.
Equation (1) may be reformed to be:

$$(d^2x/dt^2) + (K_2/m)(dx/dt) + (K_1/m)\,x = 0 \qquad (3')$$

In order to ensure an appropriate working of the solenoid valve, the spring constant $K_1$ of the disc spring 14 should be selected so as to be sufficiently larger than the constant $K_2$ for the drag, and thus the following inequality should stand:

$$(K_1/m)^2 > (4\,K_2/m) \qquad (4)$$

Provided that inequality (4) stands, the solution of equation (3) is obtained as:

$$x = \exp(-\alpha t)\,\sin(\beta\,t + \gamma) \qquad (5)$$

where: $\alpha$, $\beta$ and $\gamma$ are constants.

Accordingly, the motion of the plunger 8 will be a damping oscillation as represented by equation (5).

Figure 4:
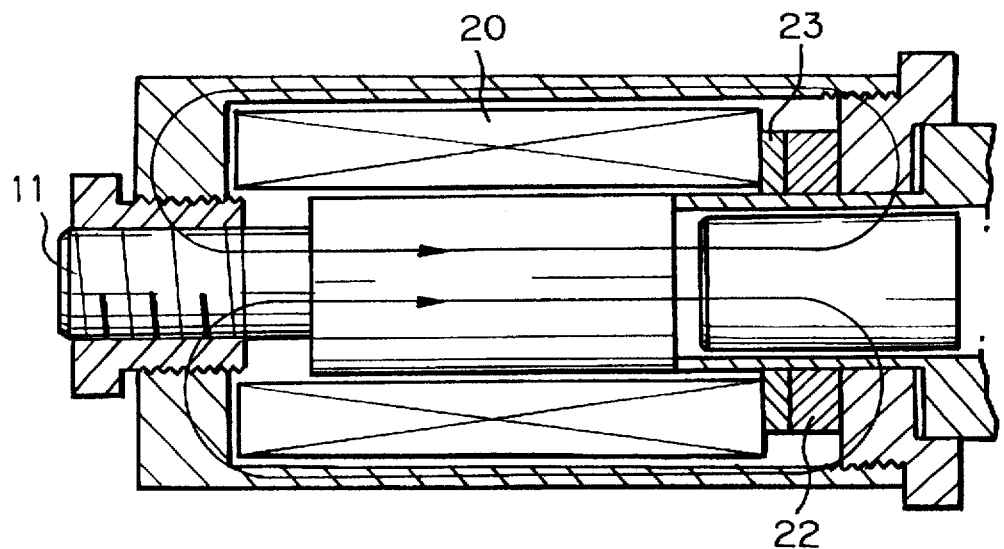
FIG. 4 is a schematic representation showing magnetic flux produced by the energized solenoid in the solenoid valve of FIG. 1.

In the solenoid valve of this embodiment, when the solenoid 20 is energized, it produces the magnetic field such as shown by the lines of flux in FIG. 4, and the plunger 8 is pulled toward the upper portion 11 of the yoke to reduce the magnetic gap 25. If the directions of the magnetic fields produced by the permanent magnet 22 and the energized solenoid 20 are opposite to each other, the resultant pulling force acting on the plunger 8 will be reduced. In contrast, if the directions of these magnetic fields are the same, the resultant pulling force will be enhanced. In either case, sufficient damping of the oscillation of the plunger 8 can be obtained only if there is slight flux leakage of the permanent magnet 22 from the plunger 8. Thus, the direction of the current in the solenoid 20 may be selected to be in a direction suitable for controlling the solenoid valve, without any limitation being imposed relative to a damping effect.

It is possible that an electromotive force may be induced in the solenoid 20 by an external, varying magnetic field influencing the solenoid 20. For example, a field may be produced by eddy currents induced in the plunger 8 by the motion of the plunger 8, if the permanent magnet 22 is shifted in the longitudinal direction of the plunger 8 from its midpoint. Also, such a field may be composed of flux leakage from the permanent magnet 22 leaking out of the plunger 8 and varying with the motion of the plunger 8. In a case such as where an electromotive force is induced in the solenoid 20, it is desirable to drive the solenoid 20 with a current having a direction opposite to that of the induced electromotive force occurring when the plunger 8 is pulled toward the upper portion 11 of the yoke, resulting in more effective suppression of the motion of the plunger 8.

In this embodiment, the lift of the valve element is adjusted by varying the magnitude of the current in the solenoid 20 while the direction of the current is kept unchanged. As an alternative embodiment, any electromotive force induced in the solenoid by the motion of the plunger 8 may be fedback to a current drive circuit (not shown) for the solenoid 20. In such an arrangement, the current in the solenoid 20 will be controlled depending on the electromotive force induced in the solenoid 20 by the motion of the plunger 8 so that the motion of the plunger 8 may be stabilized with ease.

In the embodiment of FIG. 1, the plunger 8 may have a diameter of 10 mm and the disc spring may have a thickness of 0.3 mm. An example of the solenoid valve using these parameters has indicated that the oscillation frequency of the plunger 8 is about 300 Hz. In order to minimize any flux leakage from the plunger 8, the permanent magnet 22 should be as small and strong as possible; permanent magnets containing strontium (Sr) and/or neodymium (Nd) are preferable. The solenoid 20 may consist of 3000 turns. Such a solenoid is capable of providing a maximum pulling force to the plunger of about 3.5 kgf with the current in the solenoid being of 0.2 A (amperes).

Figure 5:
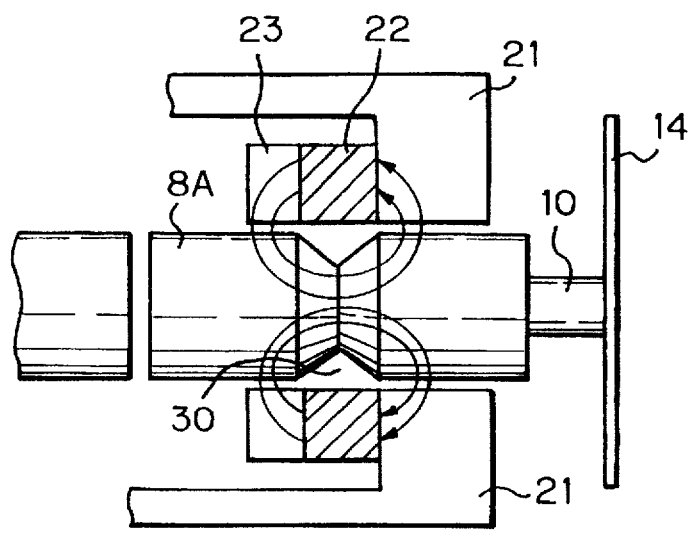
FIG. 5 is a schematic representation showing a plunger in a solenoid valve according to another embodiment of the present invention.

FIG. 5 is a schematic representation showing a plunger 8A used in a solenoid valve according to another embodiment of the present invention. The plunger 8A has a circumferential V-groove 30 (a groove with its cross-section in the form of V) formed at a position corresponding to the position of the permanent magnet 22 while the plunger 8 is at its rest position. When the plunger 8 is displaced from its rest position, the V-groove 30 leaves the position corresponding to the position of the permanent magnet 22 and thereby the reluctance of the magnetic circuit increases at the V-groove 30, so that the plunger 8 tends to return to its rest position under the magnetic force applied to the plunger 8. According to this embodiment, de-energizing of the solenoid 20 results in the return of the plunger 8 to its rest position where the V-groove 30 faces or opposes the permanent magnet 22 (with the wall of the yoke between them) even if the disc spring 14 has broken, so that improved reliability is obtained.

Figure 6:
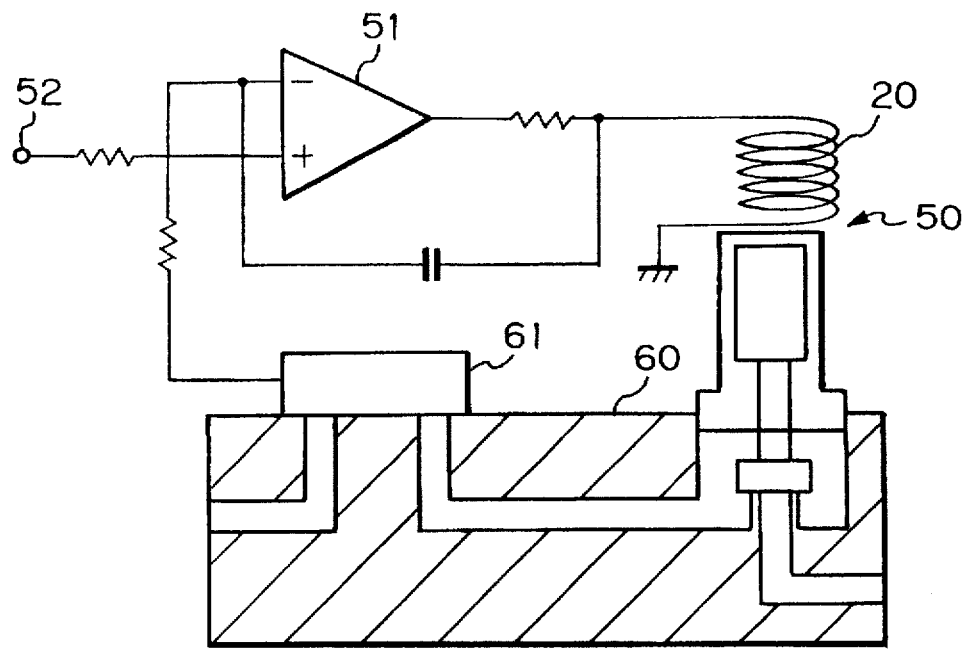
FIG. 6 is a schematic representation showing a fluid flow control system using a solenoid valve constructed according to either of the embodiments of the present invention.
Figure 7:
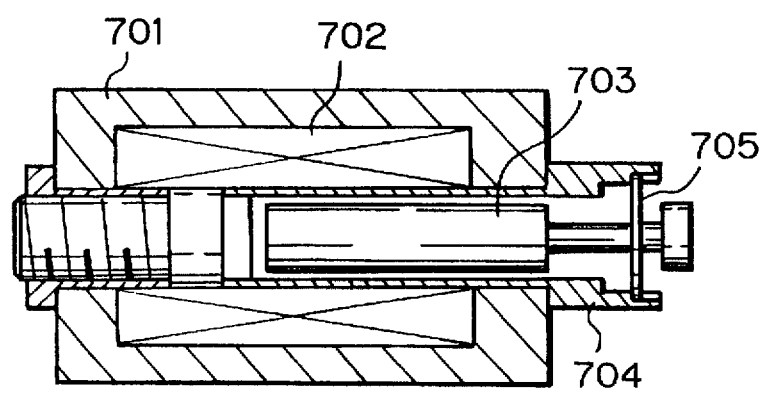
FIG. 7 is a cross-sectional view showing a construction of a prior art solenoid valve.

FIG. 6 is a schematic representation showing a fluid flow control system using a solenoid valve 50 constructed according to either of the embodiments (of FIGS. 1 and 5) of the present invention. This system includes a valve body of base 60 having fluid passageways formed therein and a flow sensor 61 mounted on the base 60. The solenoid valve 50 is also mounted on the base 60. The flow sensor 61 measures the flow of the fluid in the passageways and produces the measured flow signal supplied to one input of a comparator 51, the other input of the comparator 51 receiving a set flow signal from the input terminal 52. The comparator supplies the solenoid 20 of the solenoid valve 50 with a current depending on the difference between the set flow signal and the measured flow signal from the flow sensor 61. In this manner, the orifice as established by the valve element and the valve seat of the solenoid valve 50 is so controlled as to achieve the desired flow of the fluid.

As described above, eddy currents induced by the moving plunger produce a magnetic field which provides a damping effect on the oscillation of the plunger, resulting in swift settlement of the plunger to a desired position. Further, the solenoid valve is simple in construction.

Also, the permanent magnet may hold the position of the groove formed in the plunger so that the return of the plunger to a predetermined position may be achieved appropriately.

Further, the return of the plunger to a predetermined position may be achieved by a simple combination of the cylindrical yoke and the ring-shaped permanent magnet.

Further, the magnetic flux originating from the permanent magnet loops through the plunger back to the permanent magnet along a shortest path so that the oscillation of the plunger is advantageously suppressed with a simple structure.

While only certain preferred embodiments of the present invention have been shown and described in a detailed way of illustration, many modifications will occur to those skilled in the art and it is thus to be understood that all such modifications are covered as fall within the true spirit and scope of the invention.

What is claimed is:

1. A solenoid valve comprising:

a solenoid for producing a magnetic field;

a yoke having a central axis and being at least partially surrounded by said solenoid;

a plunger positioned within said yoke so that magnetic flux of the magnetic field produced by said solenoid can be directed by said yoke to said plunger to move said plunger relative to said yoke;

a valve element connected to said plunger; and a permanent magnet disposed outwardly of said yoke such that all of the magnetic flux of said permanent magnet traverses an outer longitudinal surface of said plunger at both magnetic poles of said permanent magnet, said permanent magnet providing a magnetic field and having a magnetization axis which is parallel relative to said central axis of said yoke, the magnetic flux of the magnetic field provided by said permanent magnet being routed through only a portion of said plunger.

2. The solenoid valve as claimed in claim 1, wherein said plunger is formed of a magnetic material.

3. The solenoid valve as claimed in claim 2, wherein:

said yoke is generally cylindrical in shape; and said permanent magnet surrounds said yoke and has the shape of a ring.

4. The solenoid valve as claimed in claim 2, further comprising a cylindrical solenoid casing surrounding said solenoid, wherein:

said yoke is generally cylindrical in shape;

said permanent magnet has the shape of a ring and surrounds said yoke;

said magnetization axis of said permanent magnet is parallel to a geometrical axis of said ring shaped permanent magnet; and an outer peripheral surface of said permanent magnet and an interior surface of said cylindrical solenoid casing define a space around said permanent magnet.

5. The solenoid valve as claimed in claim 2, wherein said plunger includes a groove which is formed in an outer peripheral surface of said plunger, and said groove opposes said permanent magnet when said plunger is in a non-activated state.

6. The solenoid valve as claimed in claim 3, wherein:

said yoke is generally cylindrical in shape; and said permanent magnet surrounds said yoke and has the shape of a ring.

7. The solenoid valve as claimed in claim 3, further comprising a cylindrical solenoid casing surrounding said solenoid, wherein:

said yoke is generally cylindrical in shape;

said permanent magnet surrounds said yoke and has the shape of a ring;

said magnetization axis of said permanent magnet is parallel to a geometrical axis of said ring shaped permanent magnet; and an outer peripheral surface of said permanent magnet and an interior surface of said cylindrical solenoid casing define a space around said permanent magnet.

8. The solenoid valve as claimed in claim 2, further comprising:

a base defining a valve chamber, an inlet passageway communicating with said valve chamber, and an outlet passageway communicating with said valve chamber; and a valve seat mounted in said valve chamber at a point of communication between said outlet passageway and said valve chamber, wherein said yoke is secured in said valve chamber so that said valve element is capable of cooperation with said valve seat to control the rate of flow of a fluid through said solenoid valve.

* * * * *